(12) United States Patent
Bonilla et al.

(10) Patent No.: US 6,697,238 B2
(45) Date of Patent: Feb. 24, 2004

(54) GROUND FAULT CIRCUIT INTERRUPTER (GFCI) WITH A SECONDARY TEST SWITCH CONTACT PROTECTION

(75) Inventors: Nelson Bonilla, West Haven, CT (US); Joseph V. DeBartolo, Jr., North Stonington, CT (US)

(73) Assignee: Hubbell Incorporated, Orange, CT (US)

( * ) Notice: Subject to any disclaimer, the term of this patent is extended or adjusted under 35 U.S.C. 154(b) by 178 days.

(21) Appl. No.: 10/032,064

(22) Filed: Dec. 31, 2001

(65) Prior Publication Data

US 2002/0145838 A1 Oct. 10, 2002

Related U.S. Application Data

(60) Provisional application No. 60/265,623, filed on Feb. 2, 2001, provisional application No. 60/265,579, filed on Feb. 2, 2001, provisional application No. 60/311,346, filed on Aug. 13, 2001, and provisional application No. 60/311,345, filed on Aug. 13, 2001.

(51) Int. Cl.[7] .............................. H02H 3/16; H02H 9/08

(52) U.S. Cl. ........................................ 361/42; 361/104

(58) Field of Search .............................. 361/42, 45, 49, 361/50, 104, 44, 46; 335/18

(56) References Cited

U.S. PATENT DOCUMENTS

| | | | | |
|---|---|---|---|---|
| 4,104,581 | A | * | 8/1978 | Arkosy ........................ 324/52 |
| 4,574,324 | A | * | 3/1986 | Packard ....................... 361/46 |
| 4,816,957 | A | | 3/1989 | Irwin |
| 4,833,564 | A | | 5/1989 | Pardue et al. |
| 5,136,457 | A | * | 8/1992 | Durivage ..................... 361/93 |
| 5,477,412 | A | | 12/1995 | Neiger et al. |
| 5,661,623 | A | * | 8/1997 | McDonald et al. ........... 361/42 |
| 5,706,155 | A | | 1/1998 | Neiger et al. |
| 5,729,417 | A | | 3/1998 | Neiger et al. |
| 5,963,408 | A | | 10/1999 | Neiger et al. |
| 6,040,967 | A | | 3/2000 | DiSalvo |
| 6,052,265 | A | | 4/2000 | Zaretsky et al. |
| 6,226,161 | B1 | | 5/2001 | Neiger et al. |
| 6,246,558 | B1 | | 6/2001 | DiSalvo et al. |
| 6,262,871 | B1 | * | 7/2001 | Nemir et al. ................. 361/42 |

* cited by examiner

*Primary Examiner*—Gregory J. Toatley, Jr.
*Assistant Examiner*—F Ritz
(74) *Attorney, Agent, or Firm*—John E. Holmes; Joseph J. Buczynski; Alfred N. Goodman (57) ABSTRACT

A GFCI is provided that has secondary test switch contacts. In case closing of the primary test switch contacts fails to trip the GFCI, subsequent closing of the secondary test switch contacts results in a short circuit between the AC input terminals of the GFCI. The short circuit blows a fuse disposed on the line side of the GFCI. The blowing of the fuse disables the GFCI and/or provides an indication to the user that the GFCI is defective.

20 Claims, 10 Drawing Sheets

GROUND FAULT CIRCUIT INTERRUPTER (GFCI) WITH A SECONDARY TEST SWITCH CONTACT PROTECTION

CROSS-REFERENCE TO RELATED APPLICATION

Priority is claimed based on U.S. provisional patent applications Ser. No. 60/265,623 filed on Feb. 2, 2001 by Nelson Bonilla, Ser. No. 60/265,579, filed Feb. 2, 2001 by Nelson Bonilla and Joseph V. DeBartolo, Ser. No. 60/311,346, filed Aug. 13, 2001 by Nelson Bonilla and Joseph DeBartolo, Ser. No. and 60/311,345, filed Aug. 13, 2001 by Nelson Bonilla, the entire contents of said applications being expressly incorporated herein by reference.

FIELD OF THE INVENTION

The present invention relates generally to a ground fault circuit interrupter (GFCI) device that has secondary test switch contacts to allow for removing power from the load. More particularly, the invention relates to a GFCI having secondary test switch contacts that operate to blow a fuse if actuation of the primary test switch fails to trip the GFCI.

BACKGROUND OF THE INVENTION

GFCI devices are designed to trip in response to the detection of a ground fault condition at an AC load. Generally, the ground fault condition results when a person comes into contact with the line side of the AC load and an earth ground at the same time, a situation which can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, a mechanically latched circuit breaker within the GFCI device is immediately tripped to an open condition, thereby opening both sides of the AC line and removing all power from the load. Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of different current when a line-to-ground fault occurs.

GFCI devices may be connected to fuse boxes or circuit breaker panels to provide central protection for the AC wiring throughout a commercial or residential structure. More commonly, however, GFCI devices are incorporated into electrical receptacles that are designed for installation at various locations within a building. A typical receptacle configuration is shown, for example, in U.S. Pat. No. 4,568,997, to Bienwald et al., the entire content of which is incorporated herein by reference. This type of receptacle includes test and reset pushbuttons and a lamp or light-emitting diode (LED) which indicates that the circuit is operating normally. When a ground fault occurs in the protected circuit, or when the test button is depressed, the GFCI device trips and an internal circuit breaker opens both sides of the AC line. The tripping of the circuit breaker causes the reset button to pop out and the LED to be extinguished, providing a visual indication that a ground fault has occurred. In order to reset the GFCI device, the reset button is depressed in order to close and latch the circuit breaker, and this also causes the LED to illuminate once again.

In addition to ground fault detection/protection, protection from miswiring is also needed. Specifically, GFCI receptacles of the type described above may be erroneously connected with the incoming AC source conductors being tied directly to the load or feedthrough terminals of the receptacle rather than to the source terminals. Because of the nature of the internal wiring of the GFCI receptacle, this miswiring condition is not easily detected. AC power will still be present at the receptacle outlets, making it appear that the receptacle is operating normally. If the test push button is depressed, the latching mechanism within the GFCI receptacle will be released and the reset push button will pop out, again making it appear that the GFCI receptacle is operating normally and providing the desired ground fault protection. In reality, however, no such protection is being provided because the AC source has been wired directly to the receptacle outlets without passing through the internal circuit breaker of the GFCI device.

Furthermore, a user may not know the state the GFCI is in without having to operate the test and reset buttons. Therefore a visual indication should be provided to indicate to a user the different states the GFCI is in.

Additionally, the safety function of GFCI devices depends upon power being prevented from reaching the receptacle when a trip condition occurs. A potentially unsafe condition occurs if the test button is pressed and the GFCI fails to trip. Therefore, the need exists for a GFCI device with a fail safe system to ensure that when the test button is pressed and the GFCI device fails to trip, the failed condition of the GFCI devices is indicated to the user in some manner.

SUMMARY OF THE INVENTION

The above and other objectives are substantially achieved by a system and method employing a ground fault circuit interrupter (GFCI) in accordance with the principles of the present invention. The method and GFCI include an interrupt module for breaking a plurality of conductive paths between source and load terminals of an AC receptacle in response to an imbalance of current flow in the paths. A test circuit is connected between the conductive paths, where the test circuit enables intentional generation of the imbalance of current flow. A lockout circuit places the GFCI in a lockout state when operation of the test circuit fails to break the conductive paths such that the lockout circuit breaks one of the conductive paths on a source side of the interrupt module and prevents restoration of the broken conductive path.

In another aspect of the invention, the lockout circuit includes a fusing mechanism and a secondary test switch. The fusing mechanism is connected in parallel with a first conductive path, while the secondary test switch is connected between the fuse and a rectifier bridge causing a short circuit when the primary switch fails to trip the GFCI.

Another aspect of the invention is that the GFCI cannot be powered if it is reverse wired. Specifically, if the GFCI is powered from the load side, the GFCI will not work because the electronics to operate the GFCI are on the line side.

Another aspect of the invention is that no power is provided to the face of the GFCI if the GFCI is reverse wired. Face plate contacts are connected to a set of relay contacts which when open prevent power from reaching the faceplate.

Another aspect of the present invention is that the visual indications are provided to alert a user to the status of the GFCI. For example, the user is made aware that the GFCI is operating as a receptacle without GFCI protection.

In one embodiment, a test switch comprises a primary test switch for allowing manual testing of the trip mechanism of a GFCI device, and a secondary test switch contact is activated after the primary test switch contact fails to trip the GFCI. The secondary test switch contact causes a fuse to be blown which can disable the GFCI device and/or remove power from the load in the event that the manual test is unsuccessful, or extinguishes a visual indicator.

Further in accordance with the present invention, a system and method for protecting an AC receptacle from ground faults is provided. The system and method include the step of enabling intentional generation of an imbalance of current flow in a plurality of conductive paths between source and load terminals of the receptacle. One of the conductive paths is broken when the intentionally generated imbalance of current flow fails to cause an interrupt module comprising relays to break the conductive paths. The method further provides for preventing switch restoration of the conductive path when the intentionally generated imbalance of current flow fails to cause the interrupt module to break the conductive paths such that the receptacle is placed in a lockout state.

Another object of the present invention is to provide a fail safe method and apparatus to remove power from a GFCI device.

BRIEF DESCRIPTION OF THE DRAWINGS

Throughout the drawing figures, like reference numerals will be understood to refer to like parts and components.

DETAILED DESCRIPTION OF THE PREFERRED EMBODIMENT

Figure 1:
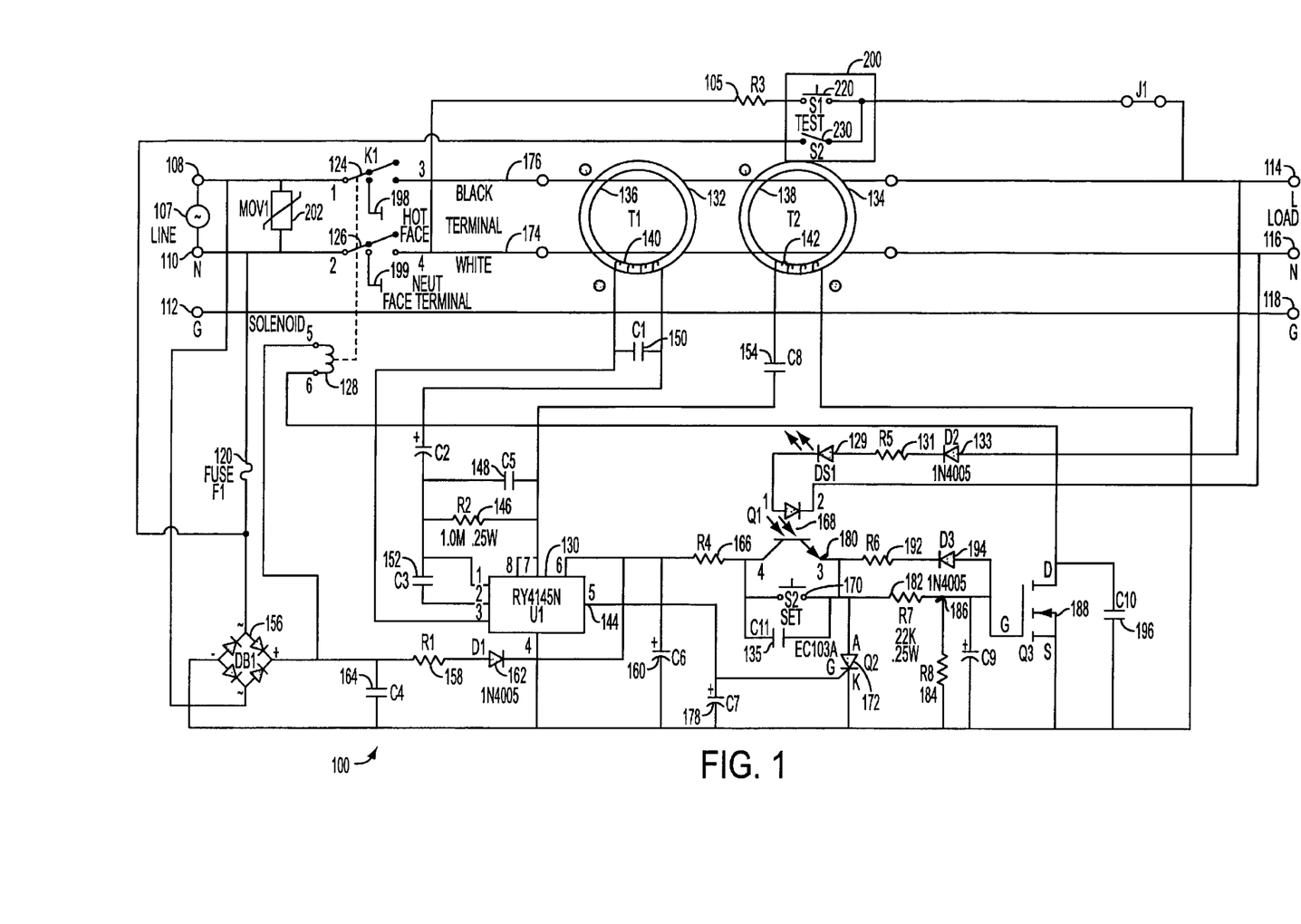
FIGS. 1–7 illustrate schematic diagrams of a GFCI device constructed in accordance with embodiments of the present invention.

Generally, it can be seen that FIG. 1 illustrates a ground fault circuit interrupter (GFCI) 100 having an interrupt module comprising relays 124 and 126, and a test switch 200 having primary test switch contacts 220 and secondary test switch contacts 230. The relays 124 and 126 break a plurality of conductive paths between source terminals 108, 110 and load terminals 114, 116 of an AC receptacle in response to an imbalance of current flow in the paths.

The test switch 200 is connected between the conductive paths, where the test switch 200 enables manual generation of an imbalance of current flow between the paths. The secondary test switch contacts 230 disable the GFCI 100 when the primary test switch contacts 220 fail to trip the GFCI 100. Specifically, the lockout circuit preferably includes a fusing mechanism such as fuse 120 and secondary test switch contacts 230 which place the GFCI 100 in a lockout state when operation of the test switch 200 and primary test switch contacts 220 fail to break the conductive paths. Thus, the lockout circuit breaks at least one of the conductive paths on a source side of the interrupt module and prevents restoration of the broken conductive path.

In the illustrated embodiment, when test switch 200 is pressed, it first closes primary switch contacts 220. If the GFCI is operating normally, closure of primary switch contacts 220 will result in the solenoid 128 losing power and opening relays 124 and 126. The opening of relays 124 and 126 results in an open condition between source terminals 108 and 110 and load terminals 114 and 116. Thus, test switch 200 subsequently closing secondary test switch contacts 230 will have no effect on GFCI 100 when relays 124 and 126 are open. The GFCI 100 can later be reset to allow the flow of power in the conductive paths again.

The GFCI 100 will now be discussed with reference to the operation of the secondary test switch contacts 230 in conjunction with the fuse 120 and diode bridge 156. Fuse 120 is connected in series with the secondary test switch contacts 230, the source terminals 108 and 110, and in series with the diode bridge 156, solenoid 128 and relays 124 and 126 and source terminals 108 and 110. Assuming that the GFCI failed to trip upon closure of the primary test switch contacts 220, the secondary test switch contacts 230 will selectively generate a short circuit between the first conductive path and the second conductive path in response to operation of the test circuit 104 as described in more detail below. The short circuit blows the fuse 120 when manual operation of the test switch 200 and closing of the primary test switch contacts 220 fails to break the conductive paths. Specifically, the blowing of the fuse 120 causes solenoid 128 to permanently lose power. Relays 124 and 126 will then permanently remain in an open condition requiring replacement of the GFCI 100.

More particularly, FIG. 1 illustrates a manually tested ground fault circuit interrupter (GFCI) device constructed in accordance with a first embodiment of the present invention. The GFCI device 100 includes the pair of input (or source) terminals 108 and 110 which are adapted to be connected to the line (L) and neutral (N) terminals, respectively, of an AC power source 107. Within the GFCI device 100, a first conductor 176 connects the AC line input terminal 108 to a corresponding AC line output (or load) terminal 114, and a second conductor 174 connects the AC neutral input terminal 110 to a corresponding AC neutral output (or load) terminal 116. A transient voltage suppressor 202 is connected across the input terminal 108 and 110 to provide protection from voltage surges due to lightning and other transient conditions. The output terminals 114 and 116 are connected, respectively, to the line and neutral input terminals of an AC load (not shown). The conductive paths established by the conductors 176 and 174 are selectively made and broken by first and second relay contact sets 124 and 126, respectively, in order to selectively connect and disconnect the input terminals 108 and 110 from the output terminals 114 and 116.

In an embodiment of the invention, relay contacts 124 and 126 are connected, respectively, to dedicated receptacle contacts. Specifically, hot receptacle contact 198 is connected to relay contact 124 and neutral receptacle contact 199 is connected to relay contact 126. The dedicated receptacle contacts 198 and 199 are structured and arranged to allow the wires of an AC power source 107 to be connected to the receptacle contacts 198 and 199 of the GFCI 100 and are electrically isolated from the load lines 114 and 116 when the relay contacts 124 and 126 are open. Thus, power is removed from the receptacle contacts 198 and 199 when there is an imbalance in current flow and/or when the GFCI 100 is locked out due to miswiring from being wired or powered from the load side rather than the line side. When load contacts 124 and 126 are closed, on the other hand, the receptacle contacts 198 and 199 enable the receptacle face to receive power.

The relay contact sets 124 and 126 are operated simultaneously by solenoid 128. Energization of the solenoid 128 causes both contacts at 124 and 126 to be held in a position opposite to that shown, thereby establishing a continuous conductive path between the input terminals 108 and 110 and output terminals 114 and 116 and delivering power from the AC source 107 to the load. When the solenoid 128 is de-energized, the relay contact sets 124 and 126 are both moved to the position illustrated in FIG. 1 by means of a biasing spring (not shown) within the relay, thereby interrupting the conductive path 174 and 176 and removing AC power from the load. The solenoid 128 is de-energized in response to the detection of a ground fault condition or miswiring, in a manner to be described below, and prevents any electrical shock hazard by immediately and simultaneously removing power from both sides of the AC load when such a condition is detected.

It will be appreciated by those skilled in the art that GFCI 100 should be wired with the AC source 107 at the line side and not at the load side. GFCI 100 is structured and arranged to require the electronics to be powered from the line side and to provide no power to the electronics when the GFCI is miswired and powered from the load side.

In the embodiment shown in FIG. 1, the relay contacts 124 and 126 are each of the single-pole double-throw (SPDT) type and when in a closed position, serve to connect the AC line and neutral conductors 176 and 174 across a shunt path comprising a diode 129, a diode 133 and a current limiting resistor 131 arranged in series. It will be appreciated by those skilled in the art that the diode 129 may be a light emitting diode to provide a visual indication that the GFCI device 100 is off either because a ground fault has occurred or the device has not been set.

For convenience, the position of the relay contact sets 124 and 126 shown in FIG. 1 will be referred to in the description which follows as the "open" position, the "closed" position being opposite to that shown since it is the opening and closing of the AC line in neutral conductors 176 and 174 that is of principal interest in understanding the operation of GFCI device 100.

The detection of the ground fault condition is implemented by a current sensing circuit which comprises a pair of transformers 132 and 134, a commercially available GFCI controller 130, and various interconnecting components. It will be appreciated that the latching system described above selectively completes the conductive paths based on a switching signal. The sensing circuit selectively generates the switching signal based on whether current flow in the conductive paths is balanced within a predetermined threshold. The GFCI controller 130 is preferably a type RV 4145 integrated circuit manufactured by the Semiconductor Division of Fairchild Semiconductor, located in South Portland, Maine. GFCI controller 130 is powered from AC input terminals 108 and 110.

The conductors 176 and 174 pass through the magnetic cores 136 and 138 of the two transformers 132 and 134, as shown, with the secondary coil 140 of the transformer 132 being connected to the input of the GFCI controller 130 and the secondary coil 142 of the transformer 134 being connected between the GFCI controller 130 and the AC neutral conductor 174. The transformer 132 serves as a differential transformer for detecting a connection between the line side of the AC load and an earth ground, while the transformer 134 serves as a grounded neutral transformer for detecting a connection between the neutral side of the AC load and an earth ground. In the absence of a ground fault, the currents flowing through the conductors 176 and 174 will be equal and opposite, and no net flux will be generated in the core 136 of the differential transformer 132.

In the event that a connection occurs between the line side of the AC load and the ground, however, the current flowing to the conductors 176 and 174 will no longer precisely cancel and the net flux will be generated in the core 136 of the transformer 132. This flux will give rise to a potential of the output of the secondary coil 140, and this output is applied to the inputs of the GFCI controller 130 to produce a trip signal on the output line 144. If the ground fault condition results from the neutral side of the AC load accidentally being connected to ground, a magnetic path is established between the differential transformer 132 and grounded neutral transformer 134. When this occurs, a positive feedback loop is created around an operational amplifier within the GFCI controller 130, and the resulting oscillations of the amplifier will likewise give rise to the trip signal on line 144.

Since the GFCI controller 130 is a commercially available component, its operation is well known and need not be described in detail. In utilizing this device, the resistor 146 serves as a feedback resistor for setting the gain of the controller and hence its sensitivity to normal faults, and the capacitor 148 in parallel with the resistor 146 provides noise filtering. Capacitors 150 and 152 provide noise filtering at the inputs of the controller, and capacitor 230 provides AC input coupling. Capacitor 154 serves as a portion of the oscillatory circuit for the grounded neutral transformer 134.

The GFCI controller 130 is powered from the AC input terminals 108 and 110 by means of a full-wave power supply comprising the diode bridge 156, a current limiting resistor 158 and a filter capacitor 160. Fuse 120 is disposed between terminal 110 and the diode bridge 156 as discussed above. One end of the secondary switch 230 is connected between the fuse 120 and the diode bridge 156. The power output of a diode bridge is also connected to one side of the solenoid 128, and diode 162 prevents the capacitor 160 from discharging from the relay through the solenoid 128. A capacitor 164 provides noise filtering across the outputs of the diode bridge 156. The line and neutral conductors 176 and 174 pass through the magnetic cores 136 and 138 of the transformers 132 and 134, as shown, with the secondary coil 140 of the transformer 132 being connected to the input of the GFCI controller 130 and the secondary coil 142 of the transformer 134 being connected between the GFCI controller 130 and the negative output terminal of the diode bridge 156.

In the absence of a ground fault condition, no output is produced by the GFCI controller 130 on line 144. Under these circumstances, current flows through a trip circuit to provide a control signal input to a further circuit which controls energization of the solenoid coil 128. The trip circuit comprises a limiting resistor 166 connected to the positive terminal of the filter capacitor 160, a controlled switching device in the form of an opto-isolator 168 having its collector connected to the opposite terminal of the resistor 166, a push button switch 170 connected across the collector and emitter of the opto-isolator 168 to serve as a set/reset, and a switching or shunting circuit in the form of a silicon controlled rectifier (SCR) 172 having its anode connected to the emitter of the opto-isolator 168 and its cathode to the neutral conductor 174.

A capacitor 135 is bridged across push button switch 170. The anode 180 between the emitter of the output isolator 168 and the anode of the SCR 172 is connected to the output line 144 connected to the GFCI controller 130. A capacitor 178 is connected between the gate of the SCR 172 and the AC neutral conductors 116 to serve as a filter for preventing narrow noise pulses from triggering the SCR. In the absence of a gating signal on line 144, the SCR 172 does not conduct. When a ground fault condition occurs, the GFCI controller 130 causes the output line 144 to go high thereby gating the SCR 172 into conduction, shorting the emitter of opto-isolator 168 directly to the AC neutral conductor 116, and thus removing the control signal from the input of the relay coil circuit. Removal of the control signal from the solenoid circuit causes the solenoid 128 to become de-energized thereby opening the relay contact sets 124 and 126 and removing AC power from the load terminals 108 and 110.

As is well known, a SCR 172 will continue to conduct as long as current flows between its anode and cathode, even after the gating signal is removed. Thus, the SCR 172 will continue to maintain the solenoid 128 in a de-energized condition, and the contact sets 124 and 126 open, even after the ground fault condition has disappeared and the output of the GFCI controller 130 on line 144 has been restored to a zero voltage level. Thus, the operation of the circuit 100 is similar to that of a receptacle-type GFCI device employing a mechanical circuit breaker, in that disappearance of a ground fault condition does not restore power to the AC load until a manual reset button 170 is pushed. The button 170 must also be pushed to provide power to the load when the GFCI device is initially powered up, or to restore power to the load after a power supply interruption at the AC source 107.

The node 180 between the emitter of opto-isolator and the anode of the SCR 172 corresponds to the input of a circuit which controls the energization of the solenoid 128. This circuit includes resistors 182 and 184, which are connected in series between the node 180 and the AC neutral conductor 174 to form a voltage divider. The node 186 between the two resistors is connected to the gate input (G) of a metal-oxide-semiconductor field effect transistor (MOSFET) 188, and the source terminal (S) of the MOSFET 188 is connected to the AC neutral conductor 174. The drain terminal (D) of MOSFET 188 is connected to one side of the GFCI controller 130, and the opposite side of the grounded neutral conductor 174. Thus, when the MOSFET 188 is gated into conduction, AC current will flow to the solenoid 128 and maintain the relay contact sets 124 and 126 in a closed position. When the solenoid 128 is de-energized by rendering the MOSFET 188 non-conductive, the relay contact sets 124 and 126 will open to remove power from the AC load.

The gating of the MOSFET 188 in the relay coil circuit is controlled by the voltage at the node 186 between the voltage divider resistor 182 and 184, and this voltage will in turn depend upon the presence of a control signal at the input of node 180 of the relay coil circuit as determined by the state of the SCR 172 of the trip circuit. A filter capacitor 190 is connected between the gate terminal of the MOSFET 188 and the AC neutral conductor 174, in order to prevent the MOSFET 188 from being gated by noise pulses. A resistor 192 and diode 194 will allow capacitor 190 to discharge quickly when the SCR 172 goes into conduction, thereby allowing for a rapid turnoff of the MOSFET 188. A capacitor 196 is connected between the drain and source terminals of the MOSFET 188 in order to prevent the MOSFET from being triggered into conduction by rapid changes and the drain source voltage a phenomenon known as dV/dT phase triggering.

Figure 2:
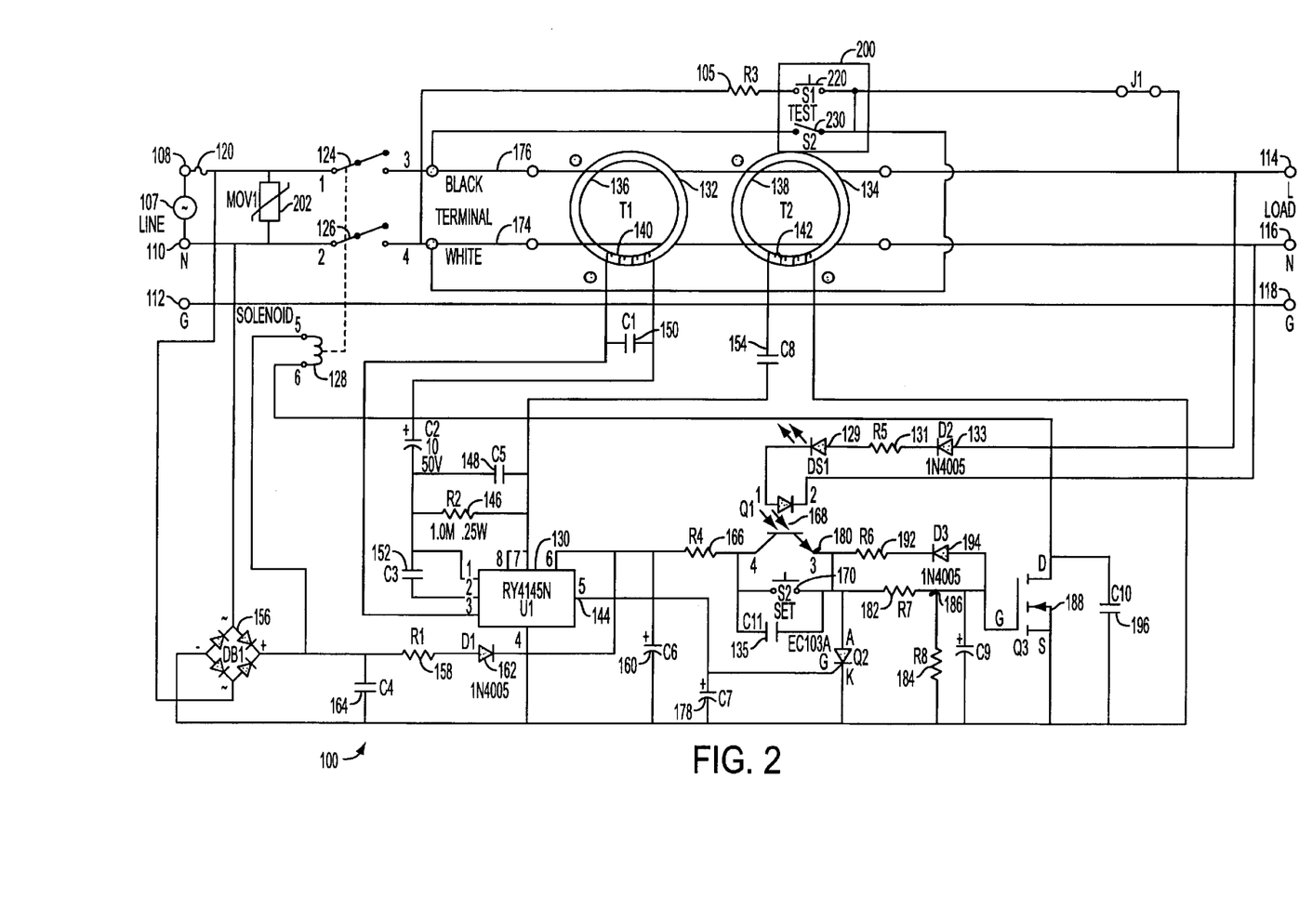

FIG. 2 illustrates a GFCI 100 constructed in accordance with a second embodiment of the present invention. This embodiment uses many of the same components as that of FIG. 1, and the same reference numerals have been used for these components. In the embodiment of FIG. 2, however, the fuse 120 is connected in series with source terminal 108. As in FIG. 1, when test switch 200 closes with primary test switch contacts 220 and GFCI 100 is operating normally, power is cut off to the solenoid 128 which results in relays 124 and 126 opening and creating an open circuit between the line and load sides of GFCI 100. The subsequent closing of secondary test switch contacts 230 by test switch 200 will have no effect on the GFCI because relays 124 and 126 will already be open.

However, if the GFCI fails to operate by removing power to the solenoid 128 when the primary test switch contacts 220 are closed by operating test switch 200, the closing of secondary test switch contacts 230 will result in a short circuit between paths 176 and 174 causing fuse 120 to blow, disabling the GFCI 100 permanently. Specifically, power is removed from the GFCI 100 via the terminal 108.

Figure 3:
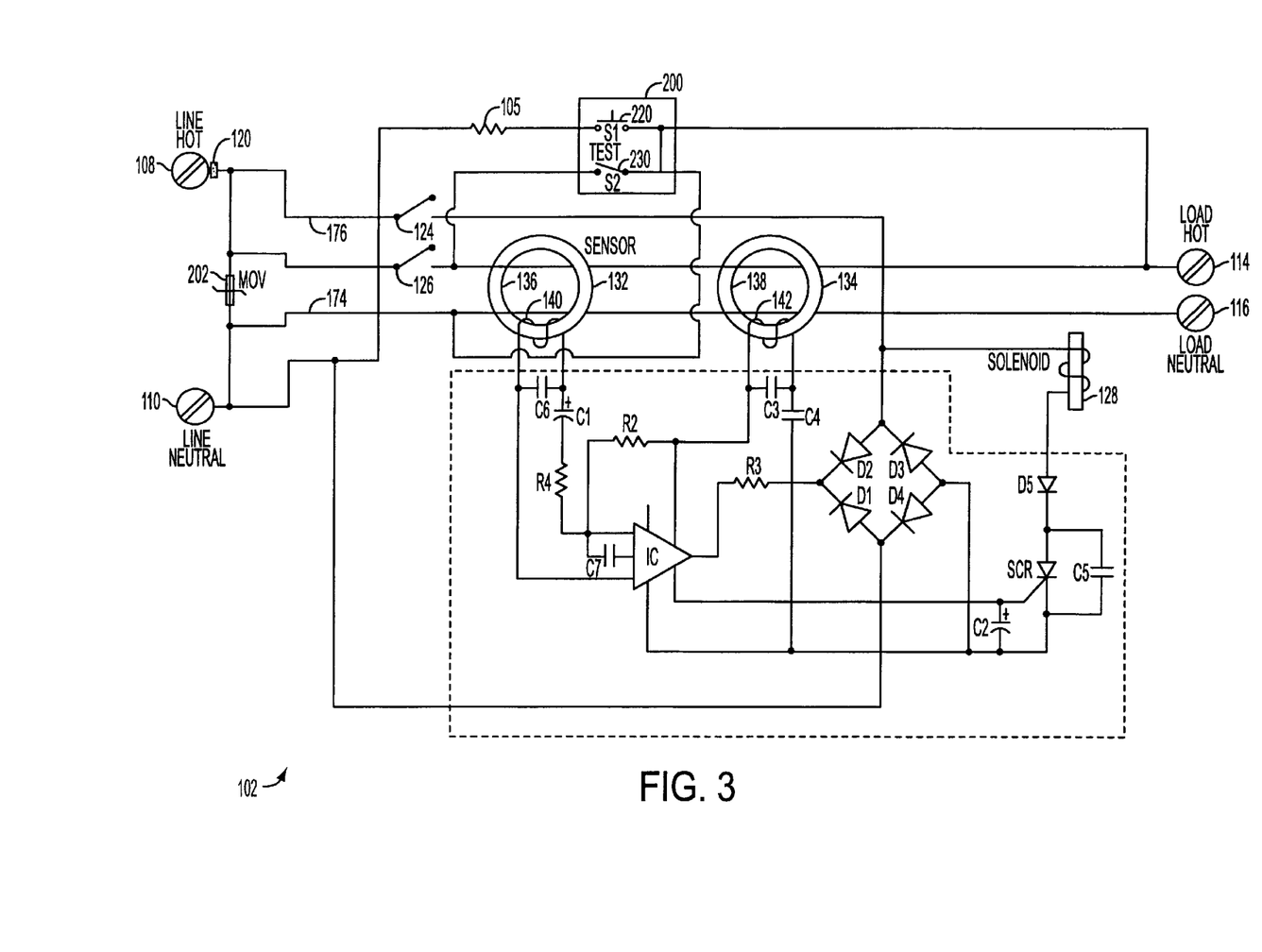

FIG. 3 illustrates a GFCI 102 constructed in accordance with a third embodiment of the present invention. This embodiment is similar in function to GFCI 100, however the device comprises different components. Specifically, GFCI 102 comprises the components listed in the table below.

| | |
|---|---|
| Capacitor C1 | 10 microfarad (MIC.) |
| Capacitor C2 | 3.3 MIC. |
| Capacitor C3 | .01 MIC. |
| Capacitor C4 | .033 MIC. |
| Capacitor C5 | .01 MIC. |
| Capacitor C6 | 470 picofarad (PIC.) |

The GFCI 102 operates in the following manner. The fuse 120 is in series with source terminal 108. However, unlike FIG. 1, the solenoid 128 does not power the relays 124 and 126 and is normally in the deenergized state. Rather, relays 124 and 126 are mechanically engaged. When a ground fault is detected, solenoid 128 is then powered and opens relays 124 and 126.

Specifically, when test switch 200 closes primary test switch contact 220 and GFCI 102 is operating normally, the solenoid 128 is powered and opens relays 124 and 126. Thus, when test switch 200 subsequently closes secondary test switch contacts 230, it has no affect on GFCI 102.

However, if the closing of primary test switch contacts 220 fails to trip the GFCI 102, subsequent closing of secondary test switch contacts 230 creates a short circuit between the line and the load. The short circuit blows the fuse 120 and permanently disables the GFCI 102 circuit via the blown fuse 120.

The pairs of test switch contacts 220 and 230 in test switch 200 which allow the user to test the operation of the GFCI device will now be described. Providing a second pair of contacts 230, along with a fuse 120 between line conductors 108 and 110, ensures a fail safe condition for the GFCI circuit 100 as discussed above.

During a manual test, the primary test switch contacts 220 close before the secondary test switch contacts 230. In accordance with the present invention, this staged operation of the switch contacts 220 and 230 in the test switch 200 allows for the primary test switch contacts 220 to create a condition that is detected by the current sensing circuit which operates the solenoid 128 to open the contacts 124 and 126 before the secondary test switch contacts 230 close. Operation of the secondary test switch contacts 230 and the corresponding fuse 120 then occurs, as described below, depending on the state (i.e., open or closed) of the contacts 124 and 126.

Figure 4:
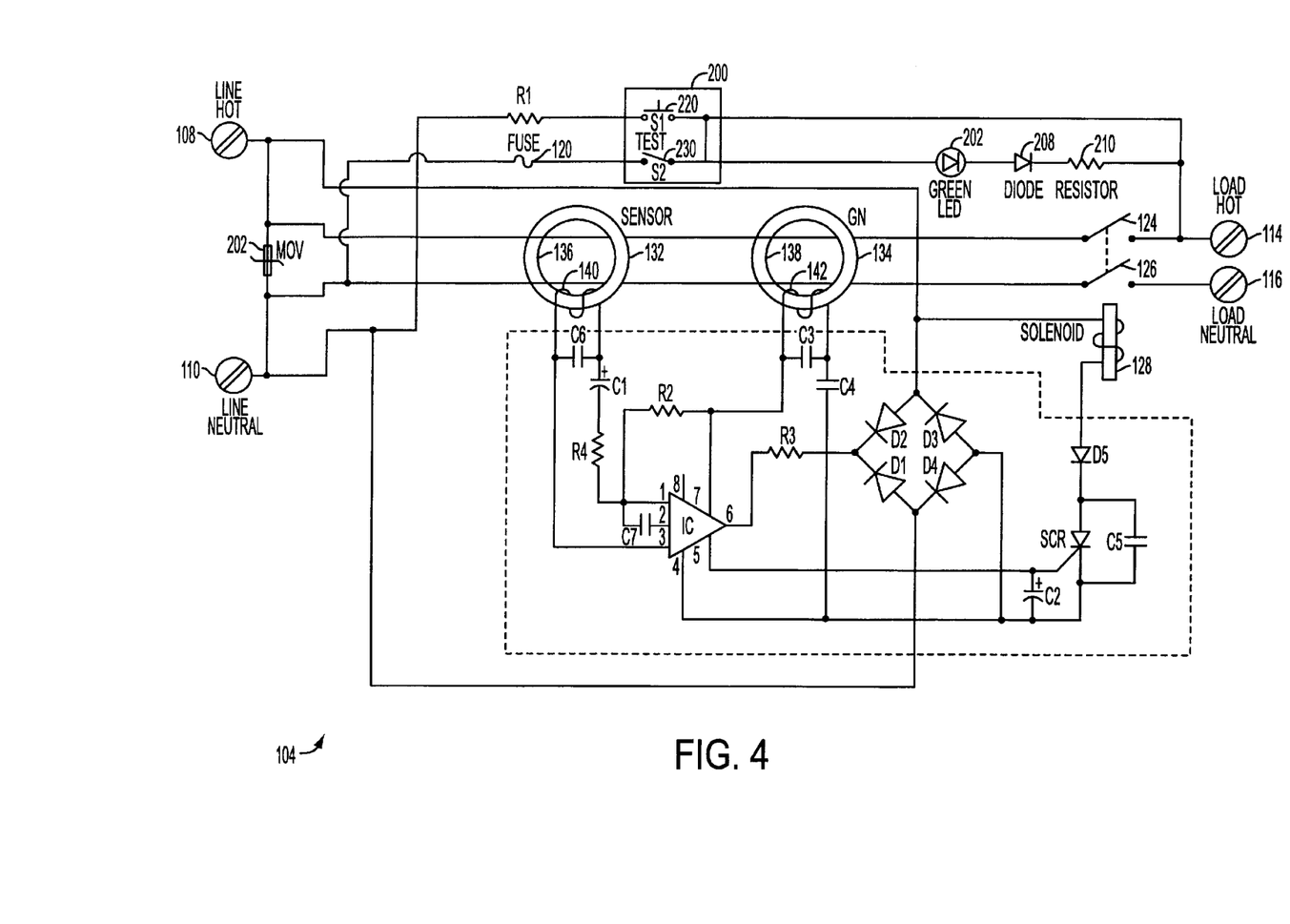

FIG. 4 illustrates a GFCI 104 constructed in accordance with a fourth embodiment of the present invention. This embodiment uses many of the same components as that of FIG. 3, and the same reference numerals have been used for these components. In the embodiment of FIG. 4, however, the GFCI 104 still operates as a receptacle after a failed manual test but does not provide GFCI protection. The green LED 202 provides a visual indication that GFCI 104 is providing GFCI protection.

When test switch 200 is pressed and closes primary test switch contacts 220 and an imbalance is created, the relays 124 and 126 open causing green LED 202 to be extinguished. Since the relays 124 and 126 are open, when test switch 200 subsequently closes secondary test switch contacts 230, there is no effect on GFCI 104.

In contrast, if the closing of the primary test switch contacts 220 fails to trip the GFCI 104, the subsequent closing of the secondary test switch contacts 230 causes a short circuit which blows the fuse 120 and extinguishes the green LED 202. However, the GFCI 104 continues, as described above, to operate as an unprotected receptacle.

Figure 5:
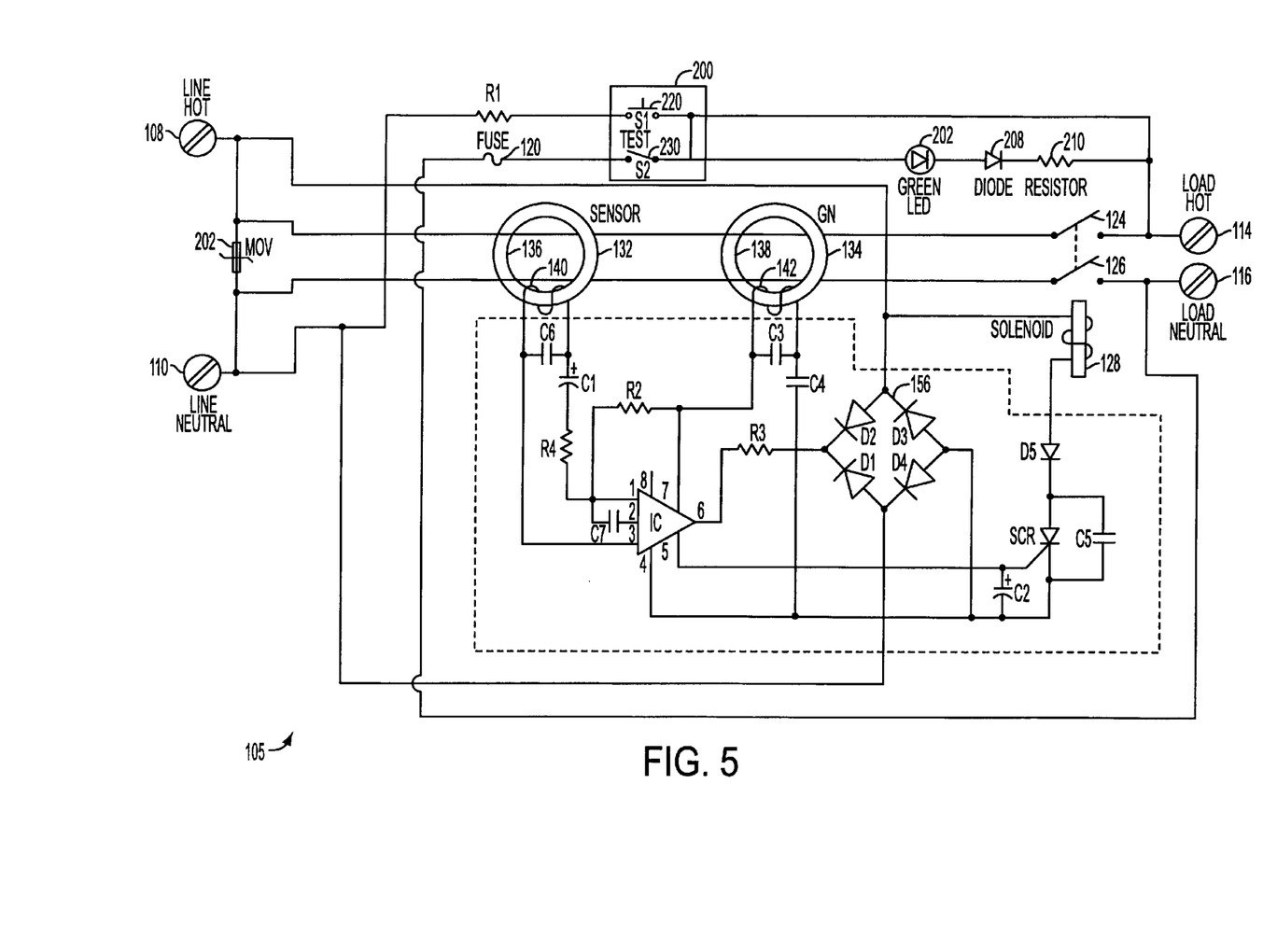

FIG. 5 illustrates a GFCI 105 constructed in accordance with a fifth embodiment of the present invention. This embodiment uses many of the same components as that of FIG. 4, and the same reference numerals have been used for these components. In the embodiment of FIG. 5, however, the GFCI 105 in addition to operating as an unprotected receptacle after a failed manual test, also provides a reverse wiring indication.

When test switch 200 is pressed and closes primary test switch contacts 220 and an imbalance is created, the relays 124 and 126 open causing green LED 202 to be extinguished. Since the relays 124 and 126 are open, the subsequent closing of secondary test switch contacts 230 by test switch 200 has no effect on GFCI 105.

In contrast, if the closing of primary test switch contacts 220 fails to trip the GFCI 105, the subsequent closing of secondary test switch contacts 230 causes a short circuit blowing the fuse 120 and extinguishing the green LED 202. As in the embodiment of FIG. 4, the GFCI 105 continues to operate as an unprotected receptacle. However, in this embodiment of the invention, even if the GFCI 105 is reversed wired, the fuse 120 is blown.

Figure 6:
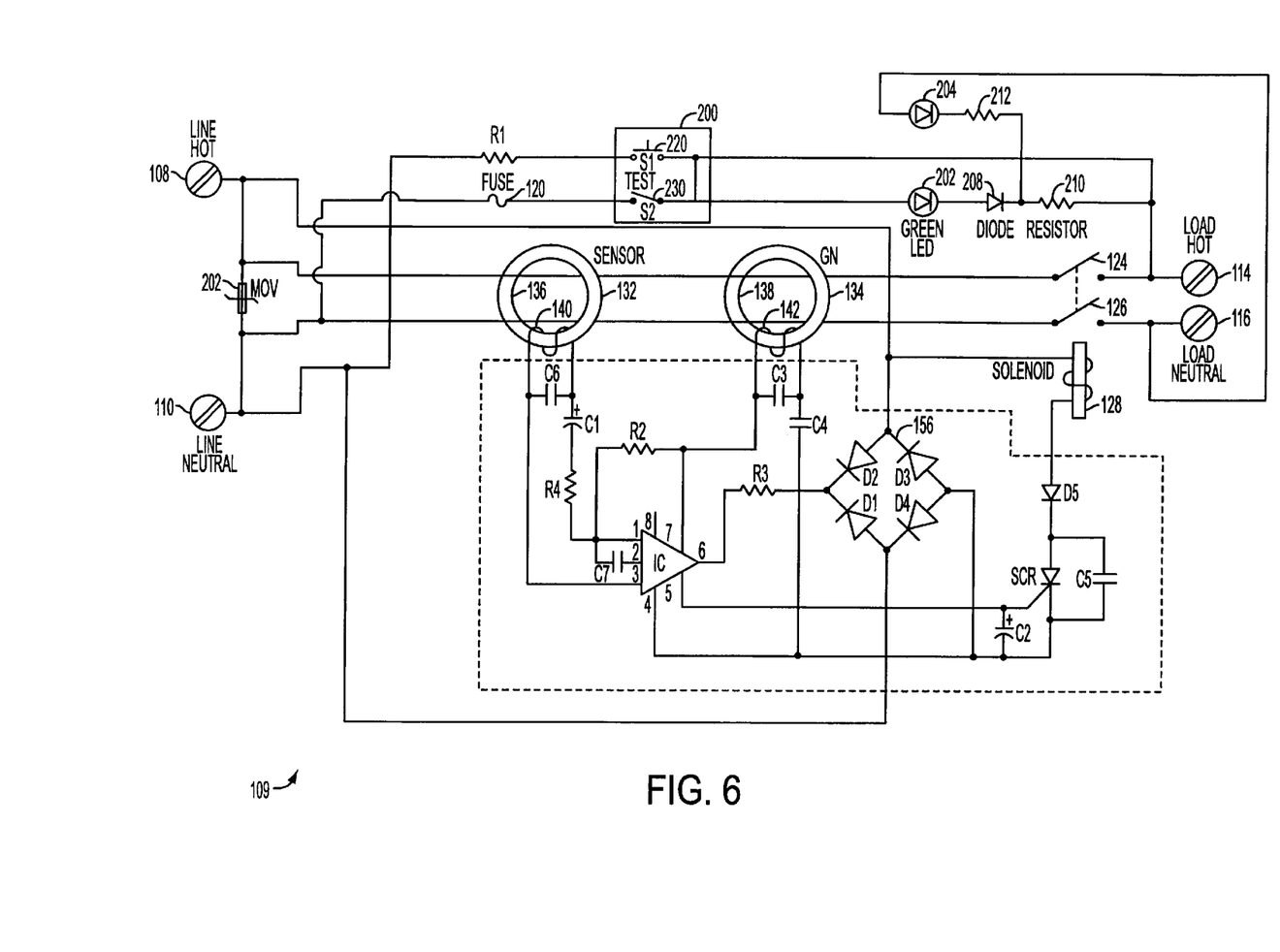
Figure 7:
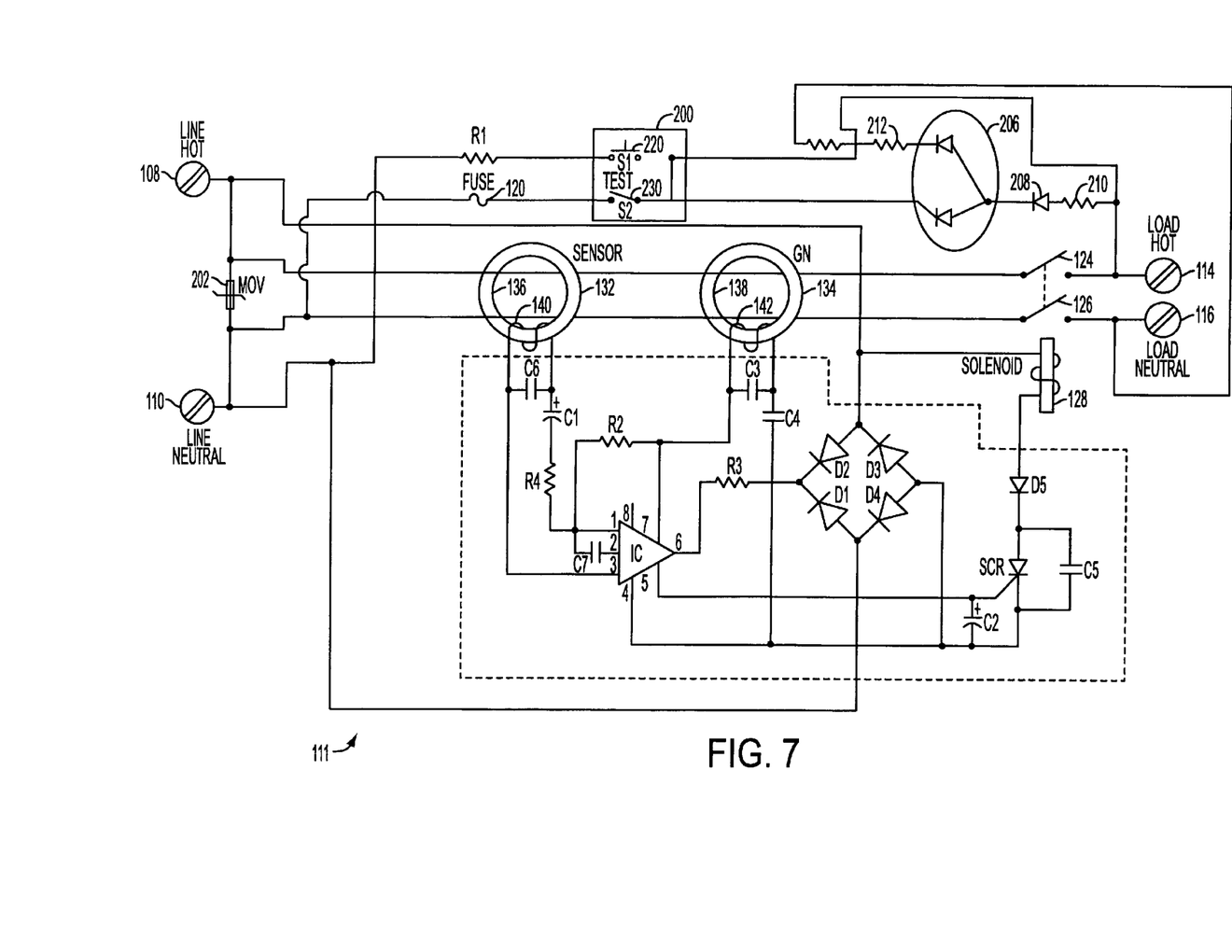

FIGS. 6 and 7 illustrate GFCIs 109 and 111, respectively, constructed in accordance with sixth and seventh embodiments of the present invention. These two embodiments use many of the same components as that of FIG. 4, and the same reference numerals have been used for these components. In the embodiment of FIG. 6, however, the GFCI 104 has two LEDs a green LED 202 and a red LED 204, to provide a visual indication of the status of the GFCI 109.

When test switch 200 is pressed and closes primary test switch contacts 220 and an imbalance is created, the relays 124 and 126 open causing green LED 202 to be extinguished. Since the relays 124 and 126 are open, subsequent closing of secondary test switch contacts 230 by test switch 200 has no affect on GFCI 109.

In contrast, if the closing of primary test switch contacts 220 fails to trip the GFCI 104, secondary test switch contact 230 causes a short circuit blowing the fuse 120 and extinguishing the green LED 202. However, the red LED 204 is illuminated to indicate that the GFCI is operating as an unprotected receptacle and not as a GFCI.

Similarly, for FIG. 7, a two-color LED 206 is used to provide a visual indication of the status of GFCI 104. The operation of the GFCI 111 in FIG. 7 is similar to that of FIG. 6 except that the two-color LED performs a similar function to that of separate LEDs 202 and 204.

Figure 8:
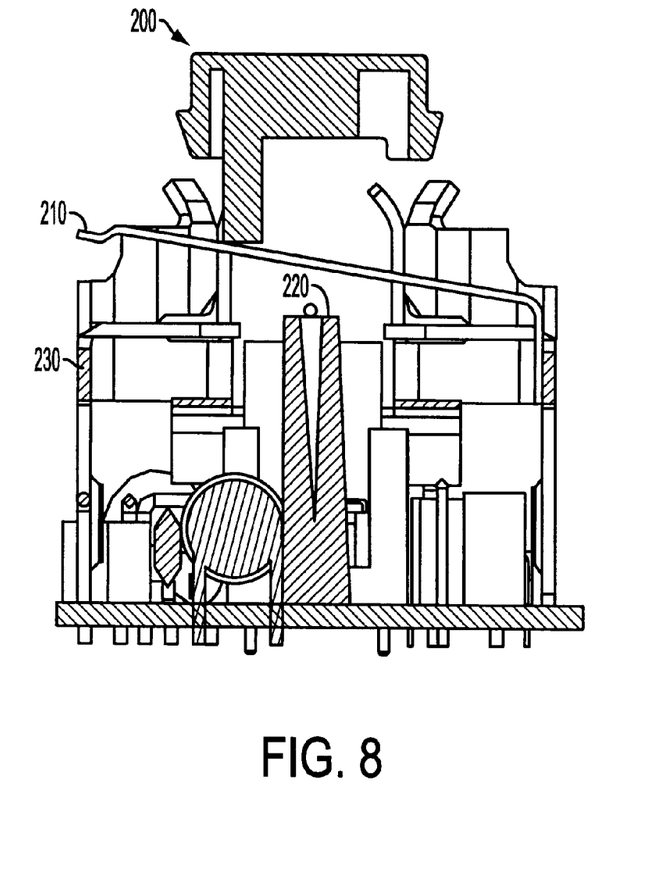
FIGS. 8, 9 and 10 illustrate a test switch used in a GFCI device constructed in accordance with another embodiment of the present invention.
Figure 9:
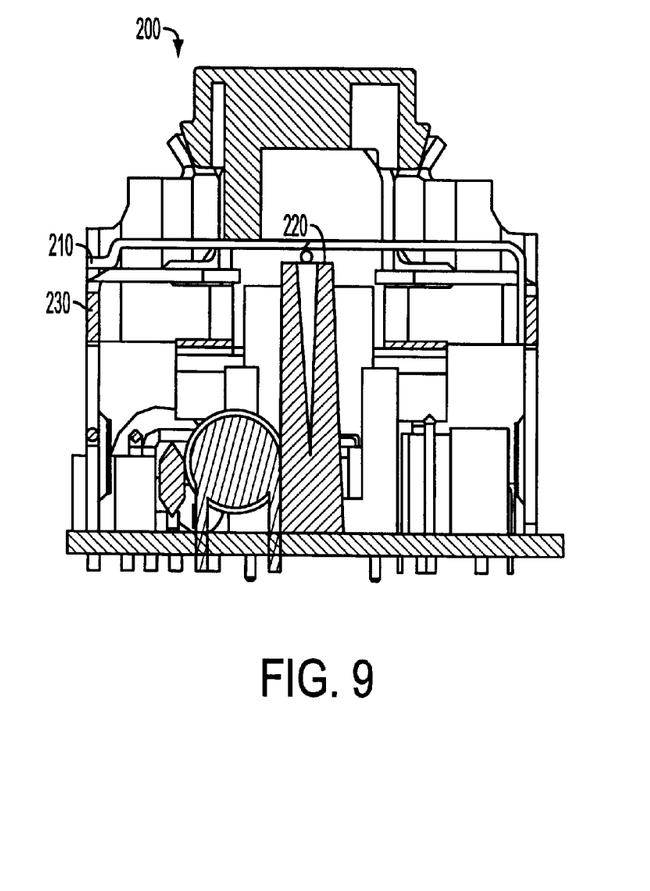
Figure 10:
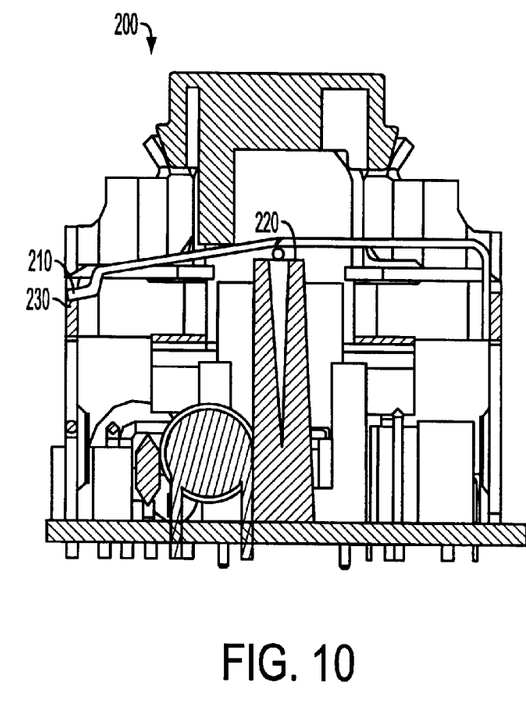

An exemplary test switch 200 is shown in FIGS. 8–10. The test switch 200 preferably comprises a unitary lever arm 210 which is disposed therein in a manner to actuate primary test switch contacts 220 prior to secondary test switch contacts 230 when depressed or otherwise activated. With reference to FIG. 2, the test switch 200 can be configured to have the same contact arrangement with respect to the primary test switch contacts 220 and secondary test switch contacts 230 as shown in FIG. 1. Accordingly, when the test switch 200 is depressed, and the lever arm 210 contacts and closes the primary test switch contacts 220, current passes through current limiting resistor 105, thus creating an imbalance in the load, which as described above triggers the solenoid 128 to open the relay contacts 124 and 126.

If this series of events fails to happen, secondary test switch contacts 230 is provided to disable the GFCI device and remove power from the load, with a single depression of the test switch 200. In other words, the lever arm 210 of the test switch 200 is designed to overtravel and subsequently complete an electrical connection between the secondary test switch contacts 230. Thus, after the primary test switch contacts 220 are closed by the lever arm 210, as shown in FIG. 9, the test switch 200 overtravels such that the lever arm 210 closes the secondary test switch contacts 230, as shown in FIG. 10. If the relay contacts 124 and 126 ate open, then the closing of the secondary test switch contacts 230 has no effect. If, however, upon testing, the relay contacts 124 and 126 do not open, then the secondary contacts 230 create a short circuit between line conductor 174 and neutral conductor 174. This short circuit causes the fuse 120 to blow, thereby creating an open circuit condition on the line conductor 174. Since the short circuit prevents the solenoid 128 from being powered, the GFCI 100 cannot be reset. This disables the GFCI device and removes power from the load, thus creating a fail safe condition.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A ground fault circuit interrupter (GFCI) for an AC electrical receptacle, comprising:

first and second input terminals for connection to the line and neutral sides, respectively, of an AC source;

first and second output terminals for connection to the line and neutral sides, respectively, of an AC receptacle outlet;

a fuse circuit containing a fuse and coupled to at least one of said first and second input terminals and said first and second output terminals;

first and second conductive paths extending, respectively, between said first input terminal and said first output terminal and between said second input terminal and said second output terminal;

a first set of electrical contacts connected in said first and second conductive paths, respectively, in order to selectively connect said input terminals to said output terminals when said contacts are closed and to selectively disconnect said input terminals from said output terminals when said contacts are open;

a control circuit for causing said contacts to open in response to an imbalance in current flow through said first and second conductive paths that is indicative of a ground fault condition at an AC load connected to said AC receptacle outlet;

a primary test switch for selectively connecting one of said first and second input terminals to one of said second and first output terminals, respectively, in order to create an imbalance in current flow through said first and second conductive paths and thereby cause said control circuit to open said contacts; and a secondary test switch adapted to be actuated in response to and following actuation of said primary test switch to complete said fuse circuit and thereby blow said fuse, wherein the blown fuse in said fuse circuit changes the operational state of said GFCI.

2. A GFCI as in claim 1, wherein said blown fuse results in said GFCI being disabled.

3. A GFCI as in claim 1, wherein said blown fuse results in said GFCI operating as a receptacle without GFCI protection.

4. A GFCI as in claim 1, wherein a visual indicator is provided to indicate the operational state of said GFCI.

5. A GFCI as in claim 4, wherein said visual indicator is extinguished in the event said fuse is blown.

6. A GFCI as in claim 4, wherein said visual indicator is capable of providing at least two colors to indicate the operational state of said GFCI.

7. A GFCI as in claim 4, wherein said operational state comprises at least one of:

normal operation of said GFCI;

an imbalance of current flow in said GFCI;

receptacle operation of said GFCI without GFCI protection; and reverse wiring of said GFCI.

8. A GFCI as in claim 1, wherein said blown fuse results in a loss of power to said control circuit.

9. A GFCI as in claim 1, wherein reverse wiring protection is provided for said GFCI.

10. A GFCI as in claim 1, wherein said fuse in said fuse circuit is blown in the event that said GFCI is reverse wired.

11. A method for providing fuse protection for a ground fault circuit interrupter (GFCI) for an AC electrical receptacle having a pair of input terminals, a pair of output terminals, a pair of electrical contacts, a control circuit, and a pair of conductive paths extending between said input terminals and said output terminals, said method comprising:

providing a fuse circuit containing a fuse and coupled to at least one of said input and output terminals;

opening said contacts via said control circuit in response to an imbalance in current flow through said conductive paths that is indicative of a ground fault condition at an AC load connected to said AC receptacle outlet, each of said pair of contacts connected to a respective conductive path in order to selectively connect said input terminals to said output terminals when said contacts are closed and to selectively disconnect said input terminals from said output terminals when said contacts are open;

selectively connecting via actuation of a primary test switch at least one of said input terminals to at least one of said output terminals in order to create an imbalance in current flow through said conductive paths and thereby cause said control circuit to open said contacts;

actuating a secondary test switch in response to and following actuation of said primary test switch to complete said fuse circuit and thereby blow said fuse, wherein the blown fuse in said fuse circuit changes the operational state of said GFCI.

12. The method of claim 11, wherein said blown fuse results in said GFCI being disabled.

13. The method of claim 11, wherein said blown fuse results in said GFCI operating as a receptacle without GFCI protection.

14. The method of claim 11, wherein a visual indicator is provided to indicate the operational state of said GFCI.

15. The method of claim 14, wherein said visual indicator is extinguished in the event said fuse is blown.

16. The method of claim 14, wherein said visual indicator is capable of providing at least two colors to indicate the operational state of said GFCI.

17. The method of claim 14, wherein said operational state comprises at least one of:

normal operation of said GFCI;

an imbalance of current flow of said GFCI;

receptacle operation of said GFCI without GFCI protection; and reverse wiring of said GFCI.

18. The method of claim 11, wherein said blown fuse results in a loss of power to said control circuit.

19. The method of claim 11, wherein reverse wiring protection is provided for said GFCI.

20. The method of claim 11, wherein said fuse in said fuse circuit is blown in the event that said GFCI is reverse wired.

* * * * *